United States Patent [19]

Job et al.

[11] Patent Number: 5,134,209

[45] Date of Patent: Jul. 28, 1992

[54] PROCESS OF PRODUCING ETHYLENE-PROPYLENE RUBBERY COPOLYMER

[75] Inventors: Robert C. Job; Larry L. Sterna, both of Houston, Tex.

[73] Assignee: Shell Oil Company, Houston, Tex.

[21] Appl. No.: 633,813

[22] Filed: Dec. 26, 1990

[51] Int. Cl.$^5$ .................... C08F 4/649; C08F 210/16
[52] U.S. Cl. .................... 526/141; 526/136; 526/348.4; 526/348; 526/938
[58] Field of Search ............... 526/141, 136, 938, 348

[56] References Cited

U.S. PATENT DOCUMENTS

| | | | |
|---|---|---|---|
| 3,514,501 | 5/1970 | Leibson et al. | 260/878 |
| 4,125,699 | 11/1978 | Yamamoto et al. | 526/169.2 |
| 4,377,671 | 3/1983 | Makino et al. | 526/124 |
| 4,506,061 | 3/1985 | Makino et al. | 526/142 |
| 4,728,705 | 3/1988 | Nestlerode et al. | 526/125 |
| 5,001,205 | 3/1991 | Hoel | 526/160 X |

FOREIGN PATENT DOCUMENTS 58-217507-A 6/1982 Japan.

OTHER PUBLICATIONS

Fred W. Billmeyer, Jr., "Textbook of Polymer Chemistry", University of Delaware and Polychemicals Department, E. I. Du Pont de Nemours & Co., Inc., 1957

*Primary Examiner*—Fred Teskin

[57] ABSTRACT

Ethylene-propylene rubbery copolymers having a high degree of random polymerization are produced by employing a high activity, stereoregular polymerization catalyst comprising a titanium halide-containing procatalyst, an organoaluminum compound cocatalyst and a moderately hindered aromatic nitrogen heterocycle as selectivity control agent. The ethylene-propylene copolymer has good properties and exhibits improved processability.

5 Claims, No Drawings

PROCESS OF PRODUCING ETHYLENE-PROPYLENE RUBBERY COPOLYMER

FIELD OF THE INVENTION

This invention relates to the production of improved copolymers of ethylene and propylene. More particularly, this invention relates to rubbery copolymers of ethylene and propylene exhibiting a high degree of random polymerization.

BACKGROUND OF THE INVENTION

The class of rubbery ethylene-propylene copolymers, conventionally referred to as EPR polymers, is well known and has gained substantial commercial acceptance. The copolymers are known to have good properties such as weatherability, ozone resistance and thermal stability and the polymers have accepted utility in automotive applications, as construction materials and as wire and cable coatings, among others. However, conventional ethylene-propylene rubbery copolymers are often difficult to process unless compounded by relatively large amounts of other materials. In many instances the ease of processing the EPR (ethylene-propylene rubber) copolymer depends upon how "rubbery" the copolymer is. In general, the more elastomeric the copolymer is, the more easily it will be processed.

A number of proposals have been made to improve the processability of the ethylene-propylene rubbery copolymer. In Yamamoto et al, U.S. Pat. No. 4,125,699, there are disclosed ethylene-propylene copolymers having a relatively high ethylene content produced in the presence of vanadium-containing polymerization catalysts. The copolymers of Yamamoto et al are said to have improved processability because of a relatively high molecular weight distribution. Vanadium catalysts, however, are of relatively low activity and many, if not most, of the more recent commercial ethylene-propylene rubbery copolymers are produced with a titanium-based catalyst because of the higher catalytic activity available through the use of such catalysts.

In determining the elastomeric character of an ethylene-propylene rubbery copolymer, a probable very important factor is the distribution of the monomeric moieties throughout the copolymer. Without wishing to be bound by an particular theory, it appears likely that each monomer, ethylene for example, can serve to disrupt the crystallinity of the portion of polymerized other monomer, e.g., propylene, through the prevention of blocks of either monomer. This disruption results in less crystallinity in the copolymer molecule and increased elastomeric character. If the ethylene and/or propylene polymerized predominantly in blocks, the structure of the resulting copolymer would be "blocky" and the elastomeric character would be relatively low. Alternatively, a highly random structure would lead to greater elastomeric character and an improvement in properties such as processability.

In published Japanese Patent Application 58217507-A there is disclosed the use of a catalyst complex derived from titanium trichloride, an organoaluminum compound and a phosphorus compound containing a $P=O$ moiety, the catalyst preparation being conducted in the presence of an ether. The product is said to have random character and good processability. A related copolymer produced with the use of a titanium tetrahalide-derived catalyst is disclosed by Makino et al, U.S. Pat. No. 4,506,061. The copolymer is also said to have a high degree of randomness in the copolymerization. It would be of advantage, however, to provide additional ethylene-propylene rubbery copolymer compositions of improved random polymerization character and improved processability.

SUMMARY OF THE INVENTION

The present invention provides ethylene-propylene copolymers of improved properties. More particularly, the invention provides ethylene-propylene rubbery copolymers having a high degree of random copolymerization.

DESCRIPTION OF THE INVENTION

The present invention relates to certain ethylene-propylene rubbery copolymers and to a process for the production thereof, which copolymers are characterized by a high degree of random copolymerization. The copolymers are produced by broadly conventional procedures but procedures which employ a particular type of nitrogen compound as a precursor of the polymerization catalyst.

The polymerization process to produce the rubbery copolymers of the invention is a liquid, or gaseous, or slurry phase process employing a high activity, stereoregular olefin polymerization catalyst of a type more commonly associated with the production of propylene homopolymers or polypropylene impact copolymers. In terms conventionally employed to describe such catalyst, the stereoregular catalysts of high polymerization activity contain a procatalyst which is usually a titanium halide-containing solid and often a magnesium halide, and which typically contains an electron donor. Suitable electron donors for use in the process of the invention include ethers, esters, nitriles, phosphines, phosphites, stibines, arsines, phosphoramides and alcoholates which are employed singly or in combination. The preferred electron donors utilized in the procatalysts of the invention are esters, particularly alkyl esters of aromatic dicarboxylic acids, e.g., diisobutyl phthalate, or phenols such as resorcinol.

The second catalyst constituent, conventionally termed a cocatalyst, is an organoaluminum compound which is typically a trialkylaluminum compound such as triethylaluminum or triisobutylaluminum or is alternatively a dialkylaluminum compound including dialkylaluminum halides such as diethylaluminum chloride and dipropylaluminum chloride, as well as dialkylaluminum alkoxides such as diethylaluminum ethoxide. Trialkylaluminum compounds are preferred. The cocatalyst is provided as such or as partial or total complex with the third catalyst constituent which is termed a selectivity control agent. Conventional selectivity control agents are illustrated by esters, particularly aromatic esters, amines, particularly aromatic esters, amines, particularly hindered amines, phosphites, phosphates, silanes including alkoxysilanes and aryloxysilanes, hindered phenols and mixtures thereof. In the process of the invention, however, the selectivity control agent is a member of a particular class of aromatic nitrogen heterocycles as is defined below. Such selectivity control agents are typically used in the production of primarily syndiotactic polypropylene or polybutylene but have not previously been used for the production of ethylene-propylene rubbery copolymers.

These high activity stereoregular olefin polymerization catalysts are described in numerous patents and other references including Nestlerode et al, U.S. Pat. No. 4,728,705. Although a variety of chemical compounds are broadly useful as the constituents of the catalysts, a typical stereoregular olefin polymerization catalyst contains as a procatalyst a solid constituent comprising a magnesium halide, a tetravalent titanium halide and an electron donor such as diisobutyl phthalate. The halide moieties of such procatalysts are typically chloride. The cocatalyst is the organoaluminum compound which is often at least partially complexed with the selectivity control agent. Use of this type of catalyst, for example in propylene homopolymerization, as is known in the art, results in a polymer product which is predominately stereoregular, i.e., predominately isotactic, and many of the catalysts are sufficiently active to cause the formation of polymers of desirable properties directly as produced without the necessity of removing catalyst residues in a deashing step.

The catalysts are illustratively formed by reacting a magnesium compound, e.g., a magnesium alkoxide such as magnesium ethoxide, with a tetravalent titanium halide in the presence of the electron donor and optionally in the presence of a halohydrocarbon reaction diluent. The resulting solid is optionally treated with additional tetravalent titanium halide and is then washed, with light hydrocarbon for example, to remove unreacted titanium compounds. The solid procatalyst is then contacted with the cocatalyst and the selectivity control agent.

The selectivity control agent employed in the process of the invention is a moderately hindered aromatic nitrogen heterocycle containing aliphatic hydrocarbon substituents on aromatic ring carbon atoms adjacent to the heterocyclic nitrogen, which substituents provide some degree of steric or electronic hindrance but not sufficient hindrance to prohibit the operation of the aromatic nitrogen heterocycle as a selectivity control agent. Thus, the presence of hydrogen substituents on adjacent ring carbon atoms as in the case of pyridine does not provide any substantial hindrance and the use of pyridine as the selectivity control agent does not result in the production of the improved ethylene-propylene copolymers of the invention. Conversely, the presence of t-butyl aromatic ring substituents as in the case of 2,6-di-t-butylpyridine results in too great a hindrance to permit production of the desired copolymers. The preferred moderately hindered aromatic aromatic nitrogen heterocycles are those of from 1 to 2 aromatic rings, with up to one additional heterocyclic atom, which have straight-chain alkyl group independently of up to 4 carbon atoms as a substituent on each aromatic ring carbon atom adjacent to each heterocyclic nitrogen atom. Illustrative of such aromatic heterocyclic amines are 2,6-lutidine, 2,4,6-collidine, tetramethylpyrazine, quinaldine, 2,4-dimethylquinoline and 2,3-dimethylquinoxaline. The preferred substituent groups for the adjacent aromatic ring carbon atoms are methyl groups and particularly preferred as aromatic nitrogen heterocycles for use as selectivity control agents are 2,6-lutidine and tetramethylpyrazine.

The use of these selectivity control agents in the production of elastomeric, syndiotactic, homopolymeric polypropylene is known from copending U.S. patent application Ser. No. 342,832 filed Apr. 25, 1989. While it is stated by Busico et al, Macromol. Chem., 184, 2193 (1983), that polypropylene polymerization catalysts which lead to syndiotactic polypropylene homopolymer are the catalysts which can catalyze the formation of alternating-like ethylene-propylene copolymers, this effect has not been demonstrated for supported high activity catalysts of commercial utility. In contrast, we demonstrate that supported high activity catalysts, such as are used in established and well known processes, can be used to produce the polymers of this invention. Although a gas-phase reaction to produce the ethylene-propylene rubbery copolymers is not precluded, the preferred processes for the production of the ethylene-propylene copolymers of the invention are liquid phase processes employing a reaction diluent which may be a non-polymerizable diluent such as propane or liquified monomer of the polymerization such as propylene. These processes, which are conducted in a batchwise, continuous or semi-continuous manner, typically involve contacting ethylene and propylene and the polymerization catalyst under conditions which have been well established in the art. The ethylene-propylene copolymer, subsequent to polymerization, is recovered by conventional methods.

Typical polymerization conditions include a reaction temperature of from about 30° C. to about 120° C., preferably from about 35° C. to about 90° C., and a pressure sufficient to maintain the reaction mixture in a liquid phase. Such pressures are up to about 40 atmospheres but more often are from about 20 atmospheres to about 30 atmospheres. The precise methods of conducting the polymerization and the control of reaction conditions, including the use of molecular hydrogen to control molecular weight, are within the skill and knowledge of the art.

The ethylene-propylene rubbery copolymers of the invention are somewhat variable in proportions. The proportion of propylene in the copolymer will be from about 30% by weight to about 90% by weight based on total ethylene-propylene copolymer, preferably from about 40% by weight to about 80% by weight on the same basis. The remainder of the copolymer is at least predominantly ethylene. It is possible for some applications that a small amount of some other α-monoolefin of up to 10 carbon atoms inclusive, such as 1-butene or 4-methyl-1-pentene, would be included within the polymer, e.g., up to about 5% by weight of the third α-olefin. Such materials, although technically terpolymers, are included within the conventional meaning of the term ethylene-propylene copolymers. The preferred copolymers of the invention, however, are those having a propylene content as indicated above with the remainder being substantially all ethylene, i.e., the copolymer consists essentially of ethylene and propylene.

The ethylene-propylene rubbery copolymers of the invention are characterized by a high degree of random copolymerization as compared with conventional ethylene-propylene copolymers. Expressed differently, the copolymers of the invention are less "blocky". This structural distinction is reflected in the improved properties of the ethylene-propylene copolymers including an improved processability, improved low temperature impact strength and lower brittle point temperature for a given amount of ethylene content.

The degree of random polymerization of a copolymer and a standardized means of representing that are discussed in "Textbook of Polymer Chemistry", F. W. Billmeyer, Jr., Interscience Publishers, New York, 1957, page 221 et seq.. The extent to which various types of polymerization can and do take place is determined, at least in part, by the reactivity of a growing polymer chain terminating with one monomer towards its own monomer as compared with reactivity toward the other monomer. When such a growing polymer chain exhibits a strong preference for reaction with the other monomer, an alternating structure is observed. When a growing polymer chain exhibits the same preference for reacting with one monomer or the other, a random copolymerization takes place and the two types of monomer will be found randomly along the polymer chain in relative amounts determined by the composition of the olefin feed. A strong preference for reacting with the same monomer leads to block polymers.

In the Billmeyer text, the term "monomer reactivity ratio" is defined for the rate constants $r_1$ and $r_2$ for a polymer chain terminating in a first monomer (e.g., propylene) and a second monomer (e.g., ethylene), respectively, reacting with its own monomer as opposed to reacting with the other monomer. The magnitude of the value is related to the tendency to react with the same monomer as that terminating the growing polymer chain. For example, if a value of $r_1$ is greater than 1, it has the significance that a chain terminating in a first monomer ($M_1$) prefers to react with additional first monomer. A value of $r_1$ less than 1 signifies that the $M_1$-terminating copolymer chain would prefer to react with the second monomer $M_2$). Corresponding considerations apply to values of $r_2$. Although the discussion of this reference is presented in terms of free radical polymerizations of a somewhat different type, the considerations apply generally to copolymerizations leading to the ethylene-propylene rubbery copolymers of the invention. The reference further describes the copolymerization in terms of the product of monomer reactivity ratios, i.e., $r_1r_2$. A value of $r_1r_2$ equal to zero is a necessary condition for formation of an alternating copolymer. A value of $r_1r_2$ of 1 would indicate completely random copolymerization. A value of $r_1r_2$ greater than 1 would indicate that the copolymer is at least somewhat blocky and the higher the value of $r_1r_2$ is determined to be, the more blocky the copolymeric chain will be. In the ethylene-propylene copolymers of the invention, the value of $r_1r_2$ as defined above is less than about 2.1, for ethylene content above 20% mole, and is preferably less than 1.7. The mathematical derivation of the $r_1r_2$ values is described in the above textbook reference.

The $r_1r_2$ value for a given copolymer is experimentally determined traditionally by measuring copolymer composition as a function of the composition of the feed as is also described. An alternate and more direct method is based on the nuclear magnetic resonance (NMR) spectra of the copolymer, particularly the $^{13}C$-NMR spectra, as described by Kakugo et al, Macromolecules 15, 1150 (1982). Although there may be additional factors which complicate the interpretation of the $r_1r_2$ value, $r_1r_2$ is used as a measure of copolymer randomicity because it is a well established and commonly used parameter for this purpose.

Because of interfering peaks in the $^{13}C$-NMR spectrum, it is difficult to measure the syndiotacticity of the ethylene-propylene copolymers. However, it has been shown by P. Ammendola et al, Macromolecules 18, 1407 (1985), that a triad isotacticity may be determined in a straightforward manner. Thus, for comparative purposes, copolymers of high syndiotacticity shall be construed to mean copolymers with low triad isotacticity.

The polymeric compositions of the invention are therefore ethylene-propylene rubbery copolymers having a relatively high degree of random copolymerization, i.e., a relatively high degree of "randomness" and high syndiotacticity. To the rubbery copolymers may be added a variety of the conventional additives for this type of polymer including stabilizers, antioxidants, fillers, colorants, processing aids and mold release agents. The ethylene-propylene copolymers are processable by conventional methods such as extrusion and injection molding and have established utility as precursors of shaped parts such as automotive and electrical housings, wire and cable coatings, as construction materials and in blending applications with other polymers. Because of the high degree of random copolymerization, the ethylene-propylene copolymers are less blocky and less crystalline and are more easily processable at lower processing temperatures.

The invention is further illustrated by the following Illustrative Embodiment which should not be regarded as limiting.

ILLUSTRATIVE EMBODIMENT

The procatalyst was of the high activity TiCl$_4$ and aromatic ester supported on magnesium chloride type and was prepared as described in Job, U.S. Pat. No. 4,804,648.

The procatalyst precursor was a crystalline magnesium methoxide compound of the formula: $Mg_4(OCH_3)_6(CH_3OH)_{10}$ (resorcinol)$_2$ hereinafter termed "M", which was prepared by the dropwise addition of a tetramethoxysilane stabilized 12% magnesium methoxide solution to a solution of 0.5 equivalent of 2-methylresorcinol in methanol. Partial azeotropic dissolvation of the crystalline material was carried out by slurrying 40 grams of the crystalline magnesium methoxide compound in 300 grams of cyclohexane containing 120 grams of tetraethoxysilane and boiling this mixture until a decrease of 20 to 30% in solvent volume had occurred.

The procatalyst was prepared by stirring 7.8 grams of the partially desolvated "M" with 2.5 ml of diisobutylphthalate in 200 ml of a 50-50 (vol/vol) titanium tetrachloride-chlorobenzene solution for 1 hour at 115° C. then collecting the solids by hot filtration. The solids were treated with two washes at 115° C. with fresh 200 ml portions of the 50/50 solvent mixture followed by a quick rinse (less than 10 minutes) with 100 ml of fresh titanium tetrachloride-chlorobenzene solvent mixture. Excess TiCl$_4$ was removed by one wash with isooctane at 90° C. followed by two room temperature isooctane washes followed by drying under moving nitrogen at 40° C. Ti content was 2.72%. A portion of the dry procatalyst powder was then made into a 5% slurry in mineral oil.

POLYMERIZATION

In the following polymerizations, triethylaluminum was used as a 0.28 molar solution in isooctane. The procatalyst was utilized as a 5% slurry in mineral oil. The selectivity control agents (SCA), 2,6-lutidine for syndiotactic specificity and n-propyltrimethoxysilane for isotactic specificity, were used neat. The catalyst components were mixed in the mmol ratio of 0.42/0.12/0.006 (TEA/SCA/Ti) and allowed to stand at room temperature for 20 minutes. The mixture was then injected into 2.7 liters of liquid propylene in a 1 gallon stainless steel autoclave (which may contain hydrogen for molecular weight control) into which a steady, continuous ethylene flow in the range of about 1.4 to 6.0 grams per had been established (higher flow rates for higher ethylene content). In order to obtain an optimal fill ratio, the ethylene was allowed to flow into the reactor for 10 minutes prior to catalyst injection. The reactor was maintained at 60° C. for 90 minutes with continuous stirring and ethylene flow. That polymerization was uniform was attested to by a constant exotherm during that time period. After cooling the autoclave and flashing the remaining propylene, the polymer was removed as an amorphous solid material. The polymer was cut into small pieces and dried in air overnight, then for several hours under aspirator vacuum at 80° C., before physical and chemical characterizations were carried out.

In order to attain the higher levels of ethylene incorporation, polymerizations were carried out in propane diluent. Thus about 1.5 liters of propane and aboout 1.2 liters of propylene were added to the autoclave prior to catalyst injection. In one Example (Example 6) a small amount of a second comonomer (4-methyl-1-pentene) was also added. The actual final weight percentage of propylene in solution, for the various examples, is shown in Table 1. In a typical run (Example 9) the propylene dropped from 40% of the solution at the onset of polymerization to 38% at termination of polymerization, indicating that pseudo first order conditions had been maintained throughout.

$^{13}$C magnetic resonance spectra were obtained at 135° C., on samples dissolved in 1,2,4-trichlorobenzene. The spectrum reference was the mmmm methyl group. The spectral analyses were carried out with the aid of a VAX 3500 computer. The $r_1r_2$ values for each example, calculated according to the procedure outlined in the Kakugo reference, are listed in Table 1.

Examples 1 through 6 were prepared according to the teachings of this invention using a selectivity control agent which directs the production of predominately syndiotactic polypropylene. Examples 7 through 10 were prepared as comparative examples using conventional methods and a selectivity control agent which directs the production of predominately highly crystalline isotactic polymer.

To illustrate the advantages obtained by using the selectivity control agent of the invention, values were taken from the smooth curves obtained above. These values are shown in Table 2. It is clearly seen that the selectivity control agents of the invention (hindered nitrogen heterocycles) direct a more random incorporation of ethylene (significantly lower $r_1r_2$ values) than do the alkoxysilane selectivity control agents used in the practice of the current art.

TABLE 2

| Ethylene in Copolymer | Value of $r_1r_2$ using | |
|---|---|---|
| (% mole) | 2,6-Lutidine | Propyltrimethoxysilane |
| 20 | 2.05 | 2.90 |
| 30 | 1.75 | 2.84 |
| 40 | 1.55 | 2.78 |
| 50 | 1.45 | 2.72 |
| 60 | 1.40 | 2.66 |

As an additional comparative example, a commercial ethylene-propylene copolymer, marketed by HIMONT Corporation under the trademark DUTRAL®, was analyzed by $^{13}$C-NMR. The ethylene content was 56% by weight and the $r_1r_2$ value was 2.24. At 56% ethylene content the process of this invention would have given an $r_1r_2$ value of about 1.4.

The triad isotacticities of three of the above copolymers, containing equivalent amounts of ethylene incorporation, were determined from the $^{13}$C-NMR spectra by the procedure outlined in the Ammendola reference. The results are compared in Table 3. It is clearly seen that the copolymer with the lowest isotacticity exhibits a significantly lower $r_1r_2$ value (greater randomness of ethylene incorporation) than do the polymers of the comparative examples.

TABLE 3

| Example | Triad Isotacticity | $r_1r_2$ | |
|---|---|---|---|
| 5 | 29% | 1.55 | invention |
| DUTRAL® | 55% | 2.24 | comparative |
| 10 | 82% | 2.68 | comparative |

What is claimed is:

1. In the process of producing an ethylene-propylene rubbery copolymer by contacting ethylene and propylene in the presence of a liquid reaction diluent and a high activity, stereoregular olefin polymerization catalyst comprising a titanium halide-containing procatalyst and an organoaluminum cocatalyst, the improvement of producing ethylene-propylene rubbery copolymer having a high degree of random copolymerization by incorporating in the olefin polymerization catalyst a moderately hindered aromatic nitrogen heterocycle.

TABLE 1

| | Selectivity Control Agent | Propylene in Solvent (% wt) | C$_2$ in Polymer | | $r_1r_2$ |
|---|---|---|---|---|---|
| | | | (% wt) | (% mol) | |
| Example | | | | | |
| 1 | 2,6-L | 91 | 5.0 | 7.3 | 4.55 |
| 2 | 2,6-L | 91 | 7.7 | 11.1 | 3.76 |
| 3 | 2,6-L | 91 | 23.7 | 31.8 | 1.83 |
| 4 | 2,6-L | 57 | 38.2 | 48.1 | 1.35 |
| 5 | 2,6-L | 40 | 44.8 | 54.9 | 1.55 |
| 6 | 2,6-L*(+40 ml 4MeC$_5$) | 91 | 13.8 | 19.4 | 2.16 |
| Comparative Examples | | | | | |
| 7 | NPTMS | 91 | 9.2 | 13.2 | 2.92 |
| 8 | NPTMS | 91 | 23.8 | 31.9 | 3.13 |
| 9 | NPTMS | 91 | 26.2 | 34.7 | 2.64 |
| 10 | NPTMS | 40 | 52.4 | 62.3 | 2.68 |

2,6-L = 2,6-lutidine
NPTMS = n-propyltrimethoxysilane
4MeC$_5$ = 4-methyl-1-pentene
*In Example 6, trimethylaluminum replaced triethylaluminum wherein the aromatic nitrogen heterocycle has from 1 to 2 aromatic rings with up to 1 additional heterocyclic atom and a straight-chain alkyl group as substituent on each ring carbon atom adjacent to each heterocyclic nitrogen atom.

2. The process of claim 1 wherein the aromatic nitrogen heterocycle is 2,6-lutidine, 2,4,6-collidine, tetramethylpyrazine, quinaldine, 2,4-dimethylquinoline or 2,3-dimethylquinoxaline.

3. The process of claim 1 wherein each alkyl group is methyl.

4. The process of claim 3 wherein the aromatic nitrogen heterocycle is 2,6-lutidine.

5. The process of claim 4, wherein the propylene content in the copolymer is from about 30% by weight to about 90% by weight based on total copolymer with the remainder being substantially all ethylene.

* * * * *